R. T. HORLICK.
OILING DEVICE.
APPLICATION FILED DEC. 13, 1906.
961,497.
Patented June 14, 1910.
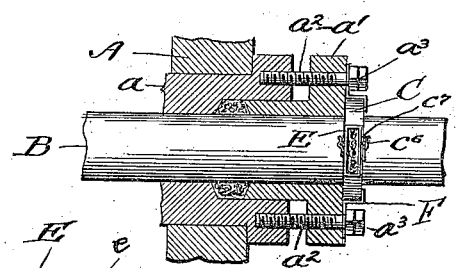
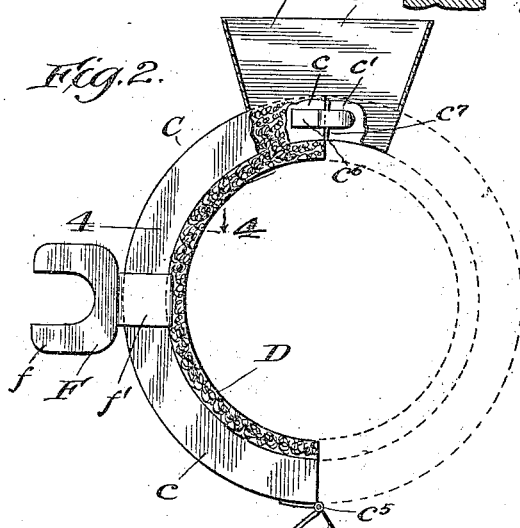
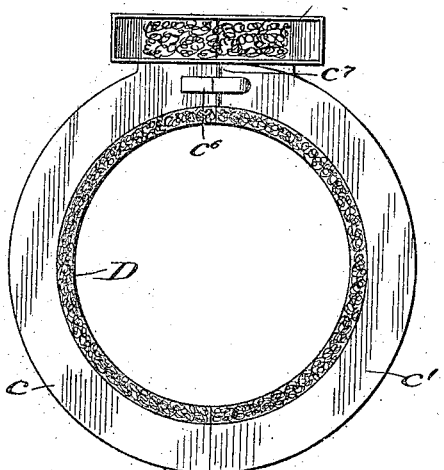
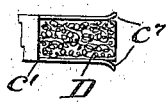
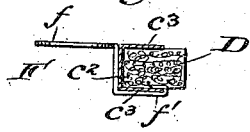

UNITED STATES PATENT OFFICE.

ROBERT T. HORLICK, OF CHICAGO, ILLINOIS, ASSIGNOR OF ONE-HALF TO EDWARD T. HORLICK, OF CHICAGO, ILLINOIS.

OILING DEVICE.

961,497.  Specification of Letters Patent.  Patented June 14, 1910.

Application filed December 13, 1906. Serial No. 347,713.

*To all whom it may concern:*

Be it known that I, ROBERT T. HORLICK, a citizen of the United States, residing at Chicago, in the county of Cook and State of Illinois, have invented a new and useful Improvement in Oiling Devices, of which the following is a complete specification.

This invention relates to improvements in oiling devices and more particularly to an oiling device adapted to simultaneously wipe and supply oil to a reciprocating shaft such as a piston rod.

It is a well known fact that piston rods and other shafts which reciprocate through stuffing boxes often wear unevenly because the lubricant is not evenly applied to their circumferences and because grit or other abrasive substances adhere to the rod and are carried by it into the stuffing box and if not detected at once often cut the rod to such an extent as to require its being redressed. In view of this fact various devices have been resorted to for oiling piston rods and the like but it has been difficult to supply the oil evenly to all sides of the rod without causing a considerable waste of oil.

The object of this invention is to provide an oiling device especially adapted to supply oil to piston rods or other shafts which reciprocate through stuffing boxes or other bearings and which not only delivers the oil equally about the circumference of the rod or shaft, but at the same time acts to prevent any foreign substance from being carried into the stuffing box through which the rod or shaft passes.

It is also an object of the invention to provide a device which will thoroughly strain the oil before applying it to the rod and which may be quickly and easily removed from the rod and replaced when it is desired to renew the oil conducting medium.

It is a further object of the invention to provide a very cheap and simple device, capable of being used upon either horizontally or vertically reciprocating rods or shafts with equal effect.

The invention consists in the matters hereinafter described and more fully pointed out and defined in the appended claims.

In the drawings: Figure 1 is a fragmentary, horizontal section of a cylinder head and stuffing box and showing the piston rod and oiling device in plan view. Fig. 2 is a fragmentary side elevation, partly in section, of the oiling device shown in Fig. 1 and showing it in open position in full lines and closed position in dotted lines. Fig. 3 is a fragmentary, vertical section taken through the hinge. Fig. 4 is a section taken on line 4—4 of Fig. 2. Fig. 5 is a fragmentary, top plan view of the clamping end of one of the sections of the wick holder. Fig. 6 is a top plan view of a modified form of the device adapted to be applied to a vertically reciprocating rod or shaft.

As shown in said drawings: A indicates a cylinder head which is provided with any usual or preferred form of stuffing box but which, as shown, comprises the gland $a$ having a follower $a'$ which is secured thereto by the stud bolts $a^2$ provided with nuts $a^3$ on their outer ends. The piston rod B passes through said stuffing box and surrounding said rod is the oiling device C which is rigidly but removably engaged to the gland by means of said bolts. Said oiling device comprises an annular receptacle or wick holder of any desired material, preferably a non-corrosive metal, and, as shown, is provided with a central aperture of somewhat larger diameter than the rod and is constructed of two semi-circular sections or channel members $c$ and $c'$, each of which has an outer wall $c^2$ and side walls $c^3$ and is open on its inner side, as shown more clearly in Figs. 3 and 4. Said sections $c$ and $c'$ are, as shown, closed at one end by the end walls $c^4$ though obviously they may be open if desired to provide a continuous channel, and said ends are connected together by means of a hinge $c^5$ which is engaged thereon and enables the device to be opened outwardly when it is desired to place the same upon the rod or to remove it. Said sections may be locked together at their opposite ends in any preferred manner to secure them about the piston rod but, as shown, a spring clasp $c^6$ is engaged on each side wall of one section and extends beyond the same and is adapted to engage the slightly outturned end $c^7$ of the side wall of the adjacent section $c'$ and thereby lock said sections in closed position. Carried within the channel of said wick holder are strips or wicks D of felt or other absorbent material, which are of a thickness, radially of the device, to entirely fill the channel and extend inwardly from the inner side of the holder a sufficient distance to press firmly upon the rod or shaft and prevent the sections from coming in contact therewith.

As shown in Figs. 1 and 2 the oiling device is adapted to be used upon a horizontal rod or shaft and therefore lies in a vertical plane when in use. A cup E is carried on said wick holder and is adapted to supply oil to the wicks and may open into the holder at any desired point, preferably through the top thereof, and as shown, the outer walls $c^2$ of said sections are shorter than the side walls at the clamping ends thereof and the cup is rigidly engaged between the side walls of one section in any manner to afford a tight joint. The cup extends beyond the end of the section to which it is engaged and the side walls $e$ thereof extend down to approximately the inner side of the sections so that the ends $c^7$ of the side walls of the section $c'$ straddle the same when closed. This construction permits the oil to enter the wick holder where it is taken up by said wick and applied to the entire circumference of that portion of the rod which travels therethrough.

Any preferred means may be employed to attach the device to the stuffing box, such as an apertured flange or flanges on the holder through which it may be bolted to the follower, but preferably, and as shown, brackets F are provided, each comprising a forked end $f$ adapted to engage the bolts $a^2$ beneath the nuts $a^3$, and a hooked end $f'$, which is offset from the forked end, as shown more clearly in Fig. 4, and is adapted to engage over the inner margin of the side wall $c^3$ and thereby hold the device rigidly but removably in place.

When it is desired to apply the device to a vertically acting piston rod or shaft, the cup G is attached to the wick holder as before described and turned upwardly as shown in Fig. 6, or, if preferred, may open through the top wall of one of the sections.

The operation is as follows: The channels are filled with wicks of felt or other material capable of holding and conveying the oil and the device is then clamped about the rod and is rigidly bolted to the stuffing box in the cylinder head or other bearing through which the shaft passes. The attaching brackets F being adjustable on the holder enables them to be adjusted suitable distances apart to receive the bolts in the stuffing box. The aperture afforded through the device for the rod or shaft is slightly less than the diameter of the rod so that the wicks bind upon and thoroughly clean the rod of any foreign matter that might enter the packing and cause wear. When oil is poured in the cup it is taken up by the wicks and applied to the rod evenly at all sides and owing to the fact that the lower or hinged ends of the sections are closed the oil cannot drip from the holder should it collect therein, thereby greatly reducing the quantity of oil required. Obviously the amount of oil which will pass through the wick to the rod will depend upon the presure with which the wick binds the shaft, the greater the pressure the more compact the wick and hence less conductive.

I claim as my invention:

1. In a device of the class described the combination with a pair of ring sections hinged together at one end and each having a channel in its inner face extending from near the hinged end to the opposite end thereof, a cup rigidly engaged with the free end of one section and extending beyond the same and adapted to project between the side walls of the other section and a spring clasp projecting from each side wall of one section and adapted to engage the other section therebetween.

2. In a device of the class described the combination with an annular wick holder comprising hinged sections, of a wick extending from the inner side thereof and adapted to engage about a shaft, a cup rigidly engaged to the end of one section and adapted to fit between the side walls of the other section and a spring clasp rigidly engaged on the side wall of one section and adapted to secure the other section in closed position.

3. In a device of the class described the combination with a sectional wick holder, of a pair of spring clasps on one section adapted to engage the other section therebetween, a wick protruding from the inner side of said holder, an oil cup opening into said holder and attaching brackets slidably engaged on said holder.

4. In a device of the class described the combination with a pair of half ring sections hinged together at one end and having a channel in their inner sides, a cup on the opposite end of one section and outturned, projecting side walls on the other section between which the cup projects when the ring is closed, a clasp on each side of one section adapted to engage the other section and attaching brackets slidably engaged in said channel and projecting radially beyond the sections.

5. In a device of the class described the combination with a pair of hinged sections, each having an outer wall, side walls and an end wall at the hinged end, of a cup opening into said sections, a spring clasp rigidly engaged on each side of one section and projecting beyond the same, the adjacent ends of the side walls of the other section being turned outwardly to engage said clasps, and adjustable brackets adapted to hook over the side walls of said sections.

6. In a device of the class described the combination with a pair of semi-circular channel members hinged together at one end, of a wick engaged in each channel member, an oil receptacle on the opposite end of one channel member adapted to extend into the other channel member when the latter is in closed position, a stuffing box and adjusting bolts therefor and means for securing said channel members directly to the adjusting bolts.

7. In a device of the class described the combination with a pair of channel members, of a hinged connection between the same adapting them to be engaged about a shaft, a wick in each channel member, an oil receptacle adapted to overlap the free end of each channel member and deposit oil directly to each wick, means for engaging the free ends of said channel members together, a stuffing box and adjusting bolts thereon, and adjustable means on said channel members adapted to be engaged with the adjusting bolts.

In testimony whereof I have hereunto subscribed my name in the presence of two witnesses.

ROBERT T. HORLICK.

Witnesses:
W. W. WITHENBURY,
MATIE WITHENBURY.